Jan. 8, 1952　　　A. F. ZITZEWITZ　　　2,582,063
METHOD OF MAKING SHORT PINS
Filed April 6, 1949　　　　　　　　　　　　　　7 Sheets-Sheet 1
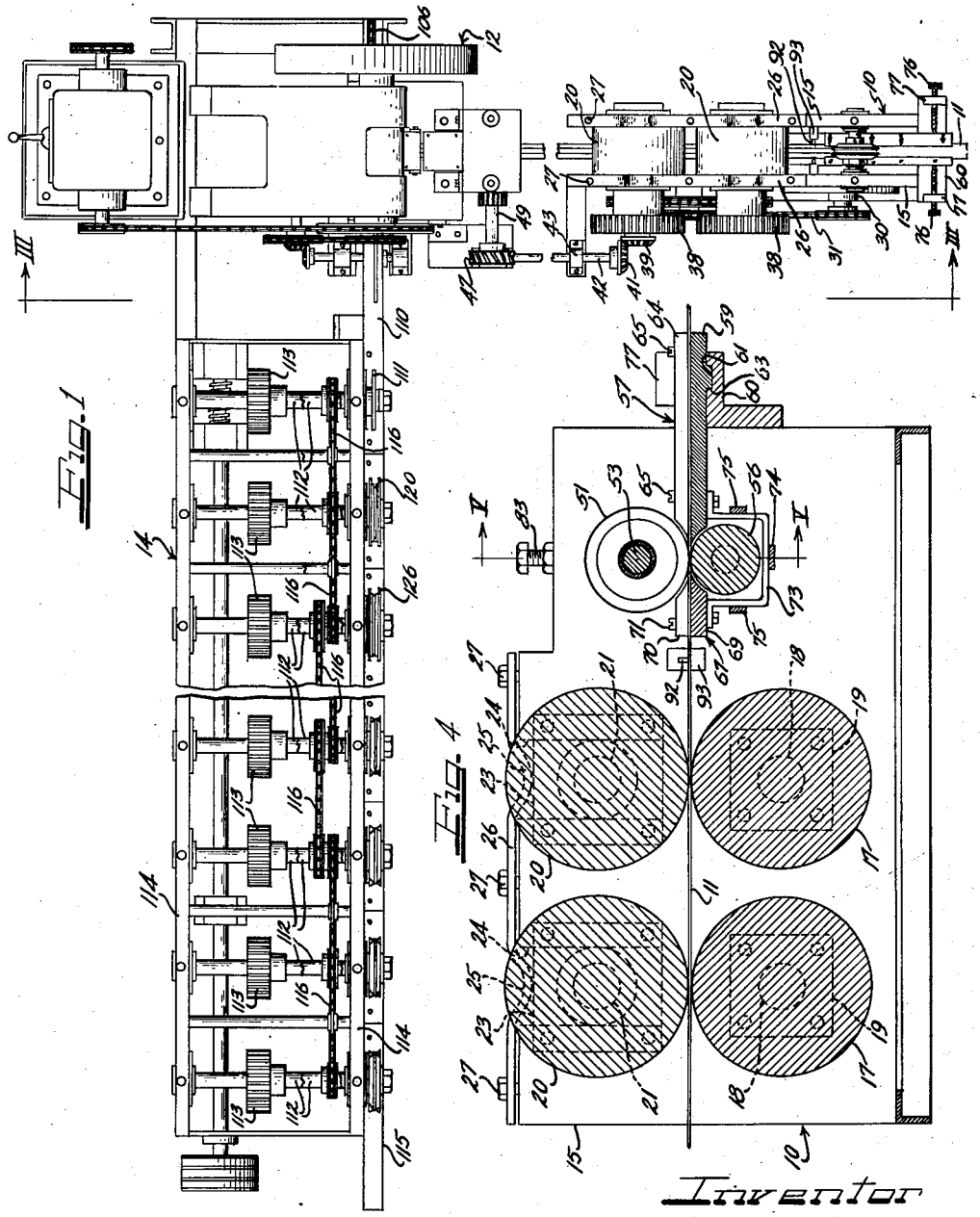
Inventor
ARTHUR F. ZITZEWITZ

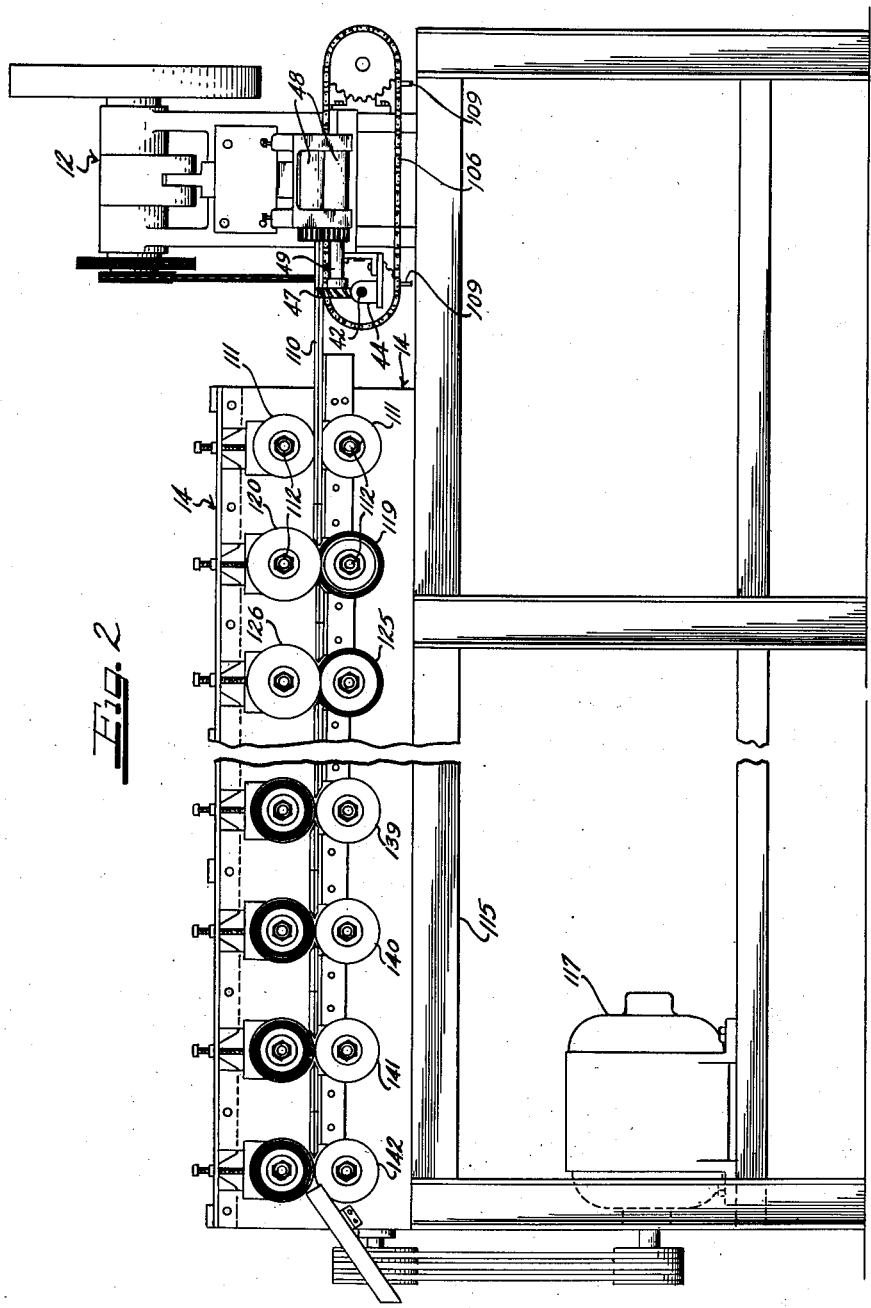

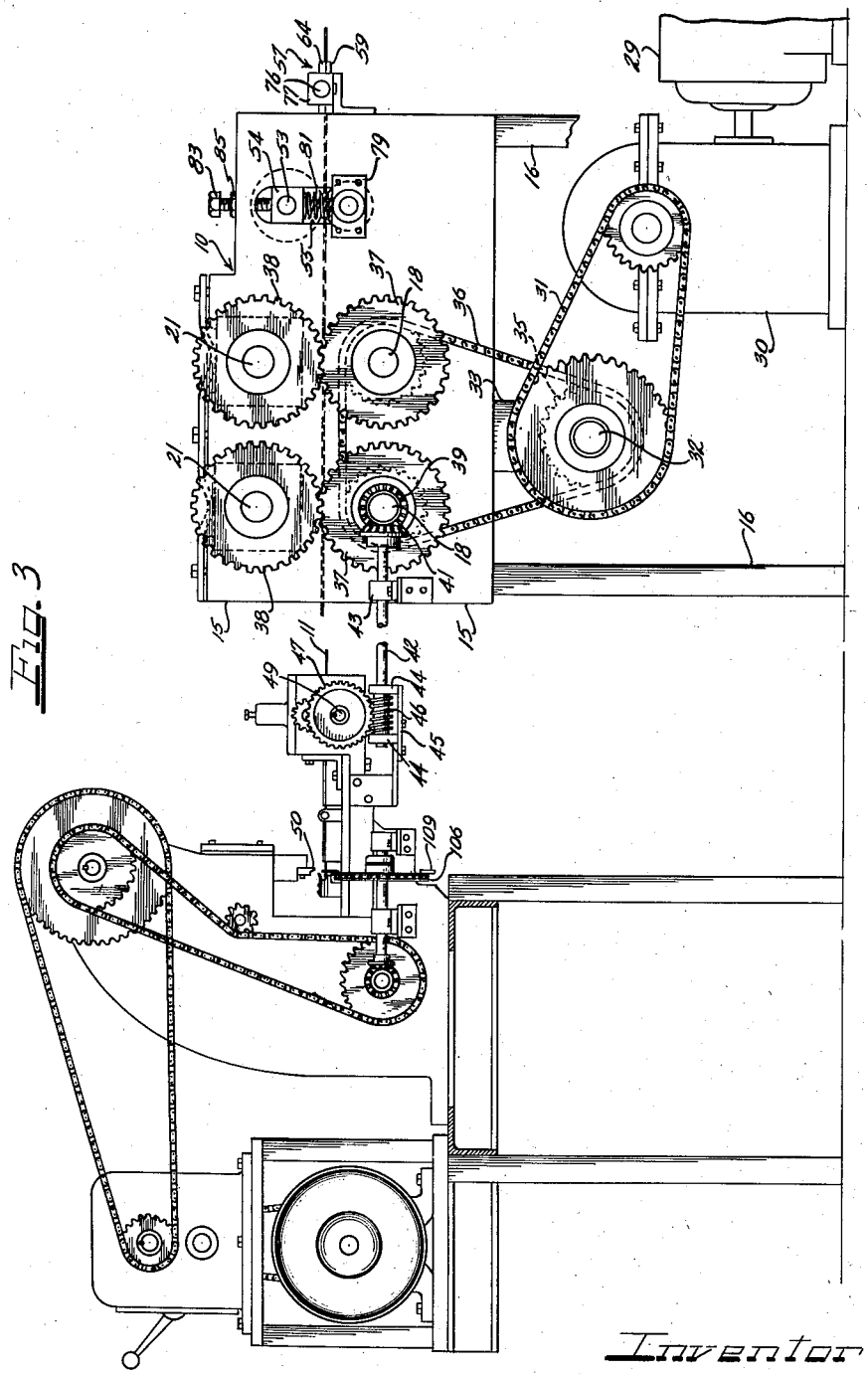

Jan. 8, 1952     A. F. ZITZEWITZ     2,582,063
METHOD OF MAKING SHORT PINS
Filed April 6, 1949     7 Sheets-Sheet 4
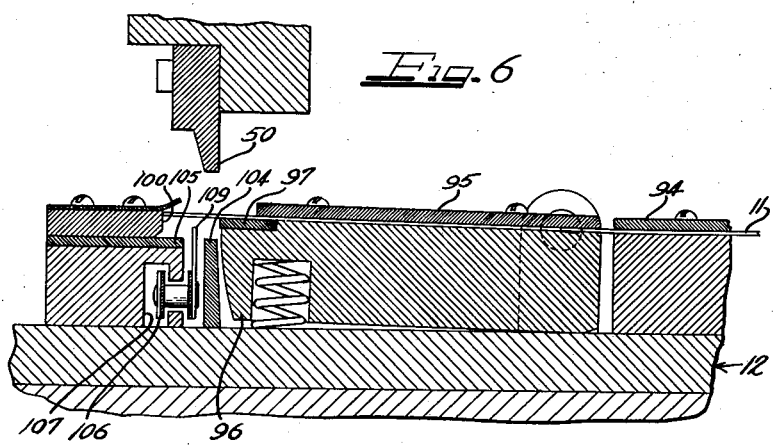
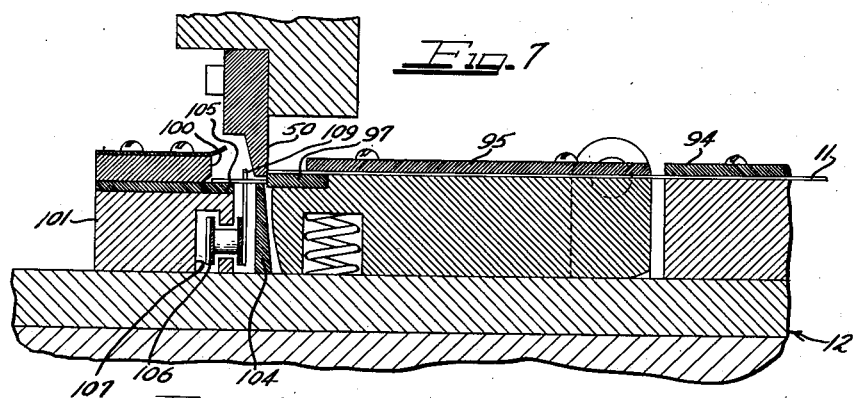
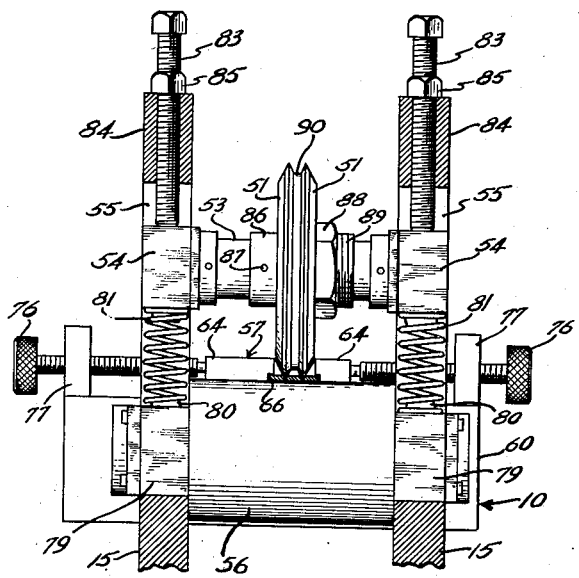
Inventor
ARTHUR F. ZITZEWITZ

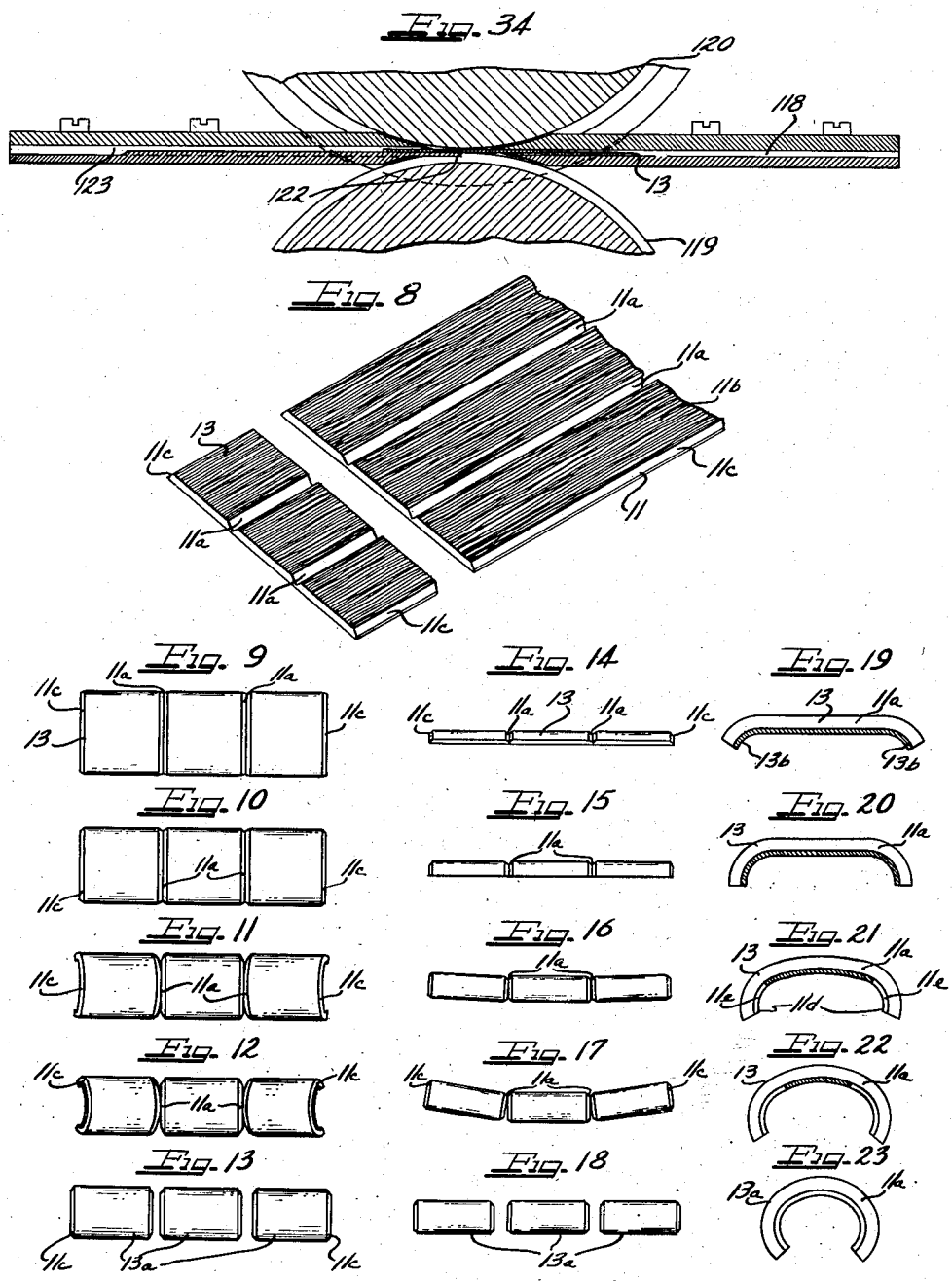

Jan. 8, 1952 A. F. ZITZEWITZ 2,582,063
METHOD OF MAKING SHORT PINS
Filed April 6, 1949 7 Sheets-Sheet 6
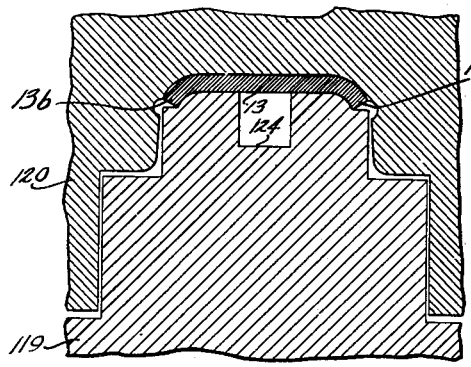
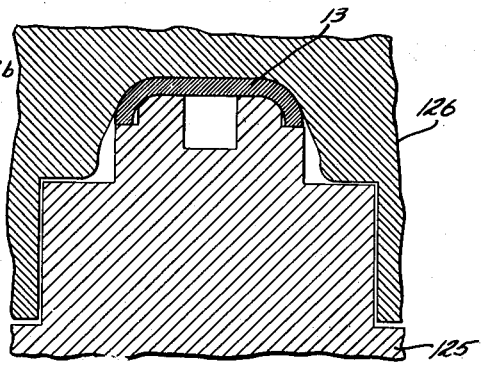
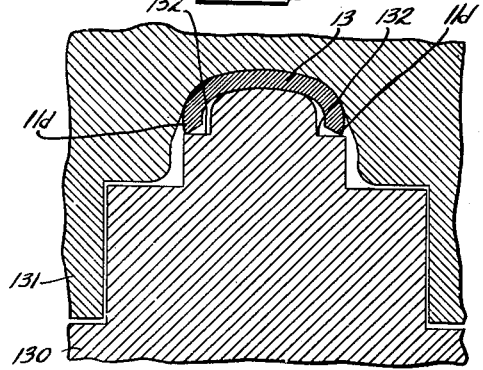
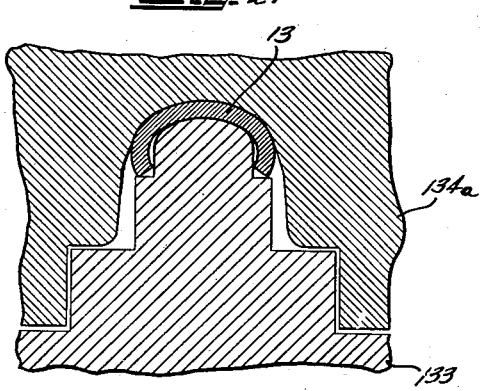
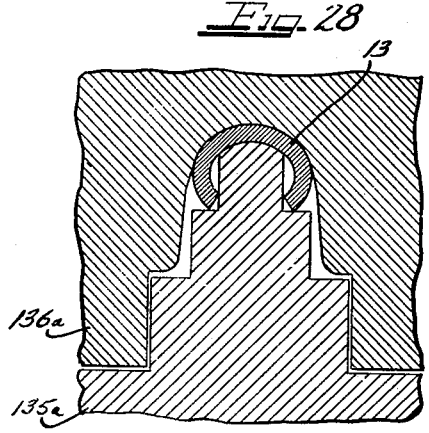
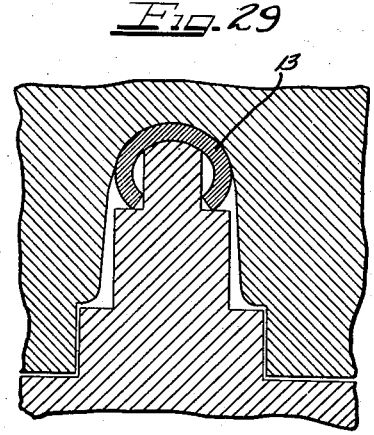
Inventor
ARTHUR F. ZITZEWITZ Jan. 8, 1952  A. F. ZITZEWITZ  2,582,063
METHOD OF MAKING SHORT PINS Filed April 6, 1949  7 Sheets-Sheet 7

Inventor
ARTHUR F. ZITZEWITZ

Patented Jan. 8, 1952

2,582,063

UNITED STATES PATENT OFFICE 2,582,063

METHOD OF MAKING SHORT PINS

Arthur Frank Zitzewitz, Chicago, Ill., assignor, by mesne assignments, to Elastic Stop Nut Corporation of America, Union, N. J., a corporation of New Jersey Application April 6, 1949, Serial No. 85,792

10 Claims. (Cl. 29—156)

This invention relates to improvements in methods for making short tubular metal pins, and particularly spring dowel pins although it relates to the making of other tubular pins as well.

Copending applications, Serial Nos. 41,633 and 184,082, filed by Howard Peters and Edward J. Haedike on July 30, 1948, and September 9, 1950, respectively, relate to a method and apparatus for making spring metal dowel pins. My present invention is in some respects similar to the method and apparatus of the foregoing application insofar as shearing, feeding and forming apparatus used therein is concerned, but is an improvement thereon, in that by the method and apparatus of my present invention it is possible to produce on the same rolling and forming machine disclosed in the foregoing application, much shorter pins than could heretofore be produced by rolling operations. By the method and apparatus of my present invention, I am able to rapidly and economically produce short metal tubular spring pins by a series of continuous operations, which pins are much shorter than the distances between guides entering and leaving the nips of adjacent rolls, in large quantities in a relatively short period of time, thus enabling the pins to be sold at a low price, and making their use feasible for various fastening operations, and for use wherever rollers or pins may be used.

The principal object of my invention is to provide a novel and improved process by which short metal tubular pins may readily and economically be produced in a continuous operation in a more facile manner than formerly.

A more specific object of my invention is to provide a new and improved method of forming short metal pins from continuous strip stock by a series of rolling forming operations, wherein a series of pins are formed from a single blank during the initial forming operations, and will separate into individual pins as soon as they are sufficiently formed to be self-sustaining throughout the remainder of the forming operations, and will be finished in the form of individual pins of the desired length at the completion of the forming operations.

A more specific object of my invention is to provide a novel and efficient method for forming short metal tubular pins from strip stock by grooving the stock into divisions equal to the desired lengths of the finished pins without severing the stock to form groove separated interconnected segments, then shearing the stock transversely to the grooves into slugs or blanks of lengths corresponding to the circumferences of the finished pins, and then feeding the grooved slugs in a direction transversely of the grooves thereof and forming the slugs successively into U-shapes and C-shapes by a series of rolling operations while guiding the shapes as they are formed, and then forming tubular shapes therefrom while breaking the slugs into the individual segments along the grooves formed solely by the forming action thereon, prior to the final forming stages, but after the initial forming stages.

A more specific object of my invention is to provide a new and improved method of forming short metal tubular spring pins having opposite beveled edges by first grooving the stock in the direction of the grain thereof with V-shaped grooves and at the same time scarfing the edges thereof, then shearing the stock transversely of the grain thereof in lengths equal to the required circumference of the finished pins and then feeding and rolling the grooved slugs through a series of rolling operations, the grooving of the slugs being of sufficient depth to hold them in connected relation during the initial forming operations, and to permit them to break when self-sustaining through the final forming operations, solely by the rolling action thereon.

These and other objects of my invention will appear from time to time as the following specification proceeds and with reference to the accompanying drawings wherein:

Figure 1 is a plan view of an apparatus for carrying out the process of my invention;

Figure 2 is a view of side elevation of the apparatus shown in Figure 1, with the grooving apparatus broken away;

Figure 3 is a sectional view taken substantially along line III—III of Figure 1;

Figure 4 is a fragmentary longitudinal sectional view taken through the grooving apparatus;

Figure 5 is a fragmentary transverse sectional view of the grooving apparatus, taken substantially along line V—V of Figure 4;

Figure 6 is an enlarged detailed fragmentary sectional view showing certain details of the apparatus for shearing the grooved strip into individual slugs;

Figure 7 is a view somewhat similar to Figure 6, but showing the shearing apparatus at the completion of the shearing operation;

Figure 8 is an isometric view of the grooved strip, showing an end thereof sheared therefrom into a slug for feeding and forming into individual pins;

Figures 9, 10, 11, 12 and 13 are plan views of the grooved slug in its various forming steps and illustrating the breaking of the slug into individual blanks in position to sustain itself during the balance of the forming operation;

Figures 14, 15, 16, 17 and 18 are views in side elevation of the slug shown in Figures 9–13, inclusive;

Figures 19, 20, 21, 22 and 23 are cross-sectional views taken along one of the grooves in the slug of Figures 9–13, inclusive, and illustrating the form thereof in transverse section throughout the various forming stages, and the form thereof just prior to and immediately after the breaking operation;

Figure 30:
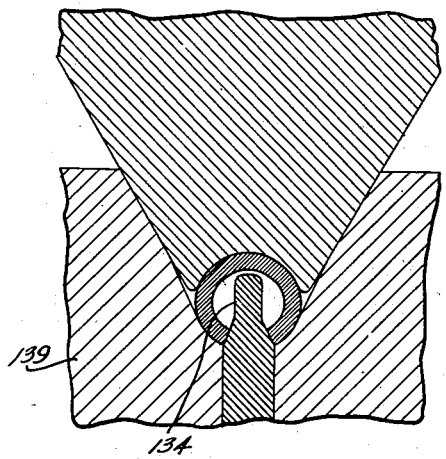
Figure 31:
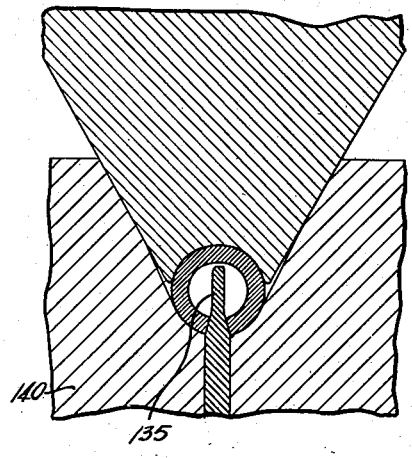
Figure 32:
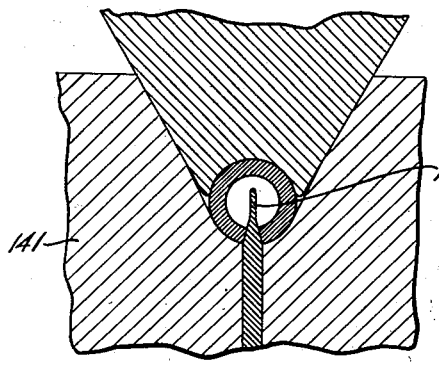
Figure 33:
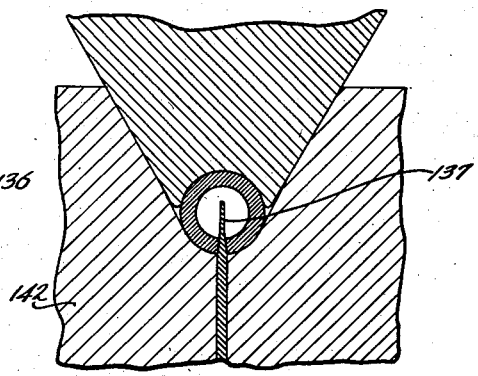
Figure 35:
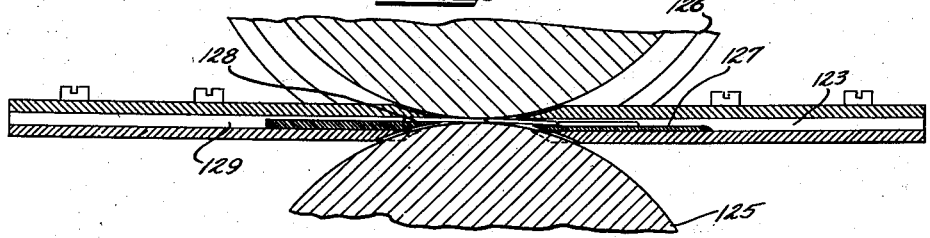

Figures 24 to 33, inclusive, are cross-sectional views taken through the successive forming rollers showing the forms of the coacting forming rollers and the slug being formed thereby from the initial to the final forming operation;

Figure 34 is an enlarged fragmentary detail longitudinal sectional view taken through the initial cooperating forming rollers and showing certain details of the guiding means for the slug, during the initial forming operation; and Figure 35 is an enlarged fragmentary detail longitudinal sectional view taken thorugh two forming rollers at a more advanced stage in the process than in Figure 34, and illustrating the slug guiding means and also shows how the slugs move upwardly into the nips between the forming rollers, during the forming operation thereof.

Referring now to the details of the embodiment of my invention illustrated in the drawings, Figure 1 illustrates generally a strip grooving and feeding apparatus 10, arranged to longitudinally groove strip metal 11 into divisions equal to the desired length of the finished pins and at the same time to scarf the edges of the strip and feed it to a shearing and feeding apparatus 12. Said shearing and feeding apparatus is arranged to shear the grooved strip transversely of its grain into individual grooved slugs or blanks 13, and to then feed the grooved slugs in a direction transversely of the grain thereof, to a rolling, forming machine 14.

The strip 11 from which the blanks 13 are formed may be a spring steel strip, the finished pins being suitably heat treated to provide the desired resiliency. I contemplate grooving the strip with V-shaped grooves 11a extending along the length of the grain 11b of the strip and of sufficient depth that the blank 13 will remain in a connected form during the initial forming stages and will break into individual blanks 13a equal to the lengths of the finished pins when sufficiently formed, to hold themselves into aligned positions when passing through the final forming stages. I also bevel the outer edges of the strip to provide beveled edges 11c at one end of the outer pins, the opposite beveled edges being formed by the bevels of the V-shaped grooves.

The strip grooving apparatus 10 includes generally a pair of parallel spaced side plates 15—15 suitably connected together, and mounted on a plurality of upright legs 16—16 (see Figure 3). Two spaced lower pinch rolls 17—17 are rotatably mounted in said side plates on shafts 18—18 suitably journaled in bearing boxes 19—19 (see Figure 4). Said bearing boxes in turn are mounted in suitable apertured portions of said side plates, and are suitably secured thereto for removal from the end of said shafts when it is desired to renew or remove the lower pinch rolls. Two upper pinch rolls 20—20, adapted to cooperate with the lower pinch rolls 17—17 are mounted in said side plates on transverse shafts 21—21. Said transverse shafts are journaled at their ends in bearing boxes 23—23, slidably mounted in upwardly opening vertical slots 24—24 formed in the side plates 15—15. The top sides of the bearing boxes 23—23 are engaged by downwardly curving resilient portions 25—25 of retaining strips 26—26, extending along and suitably secured to the top sides of each side plate 15, as by cap screws 27—27. The space between said upper and lower pinch rolls, and the tension exerted on the strip may thus be regulated by means of said cap screws and retaining strips in an obvious manner.

A motor 29, herein shown as being an electric motor, is provided to drive the pinch rolls 17 and 20 through a speed reducer 30 (see Figure 3). Said speed reducer may be of any well known form and the drive therefrom to said pinch rolls includes a chain and sprocket drive 31, driving a transverse shaft 32 journaled at its ends in bearing brackets 33—33, depending from the side plates 15—15. A sprocket 35 secured to said transverse shaft drives the two lower pinch rolls 17—17 through a chain and sprocket drive 36. The lower pinch rolls are connected to drive the upper pinch rolls by means of meshing spur gears 37 and 38, secured to the ends of the transverse shafts 18 and 21 respectively, which are adjacent the rolling and forming apparatus 14. A bevel gear 39 on the transverse shaft 18, adjacent the discharge end of the machine, meshes with and drives a bevel gear 41 on a longitudinal shaft 42, journaled adjacent one of its ends in a bearing support 43, secured to and projecting outwardly from the side plate 15, which is adjacent the rolling and forming apparatus 14. Said longitudinal shaft is journaled adjacent its opposite end in spaced bearing brackets 44—44 mounted on a bearing support 45, projecting from the shearing and feeding apparatus 12. A worm 46 secured to said shaft between said bearing brackets 44—44, meshes with and drives a worm gear 47 on a transverse shaft 49. Said transverse shaft serves to drive a pair of cooperating feed rolls 48—48 (see Figure 2), arranged to feed the grooved strip to a shearing cutter 50 of the shearing and feeding apparatus 12.

The operation of grooving the strip while it is being pulled through the strip grooving apparatus by the pinch rolls 17—17 and 20—20 is herein shown as being effected by two aligned scarfing wheels 51—51 having their outer peripheries sharpened to cut V-shaped grooves in the strip to predetermined depths so that the corresponding edges of the completed pins will be beveled. Said scarfing wheels are mounted on a transverse shaft 53 journaled at its ends in the side plates 15—15 in bearing boxes 54—54 adjustably mounted in said side plates in vertical guides 55—55. A backing roll 56 is journaled in the side plates 15—15 just beneath the scarfing wheels 51—51, and serves to back up and support the strip metal 11 during the scarfing operation thereof. A gibbed guide 57 supports and guides the strip as it enters the scarfing wheels 51—51 and has guiding engagement with the edges and upper surface thereof at the advance or entering end of the machine and extends into the nips of the backing roll 56 and the scarfing wheels 51—51. Said guide is herein shown as including a plate 59 mounted for adjustable movement transversely of the machine frame on the horizontal leg of an angle support 60. Said angle support is secured to and extends across the side plates 15—15, at the entering end of the machine. Said angle support is shown as having a guide groove 61 extending transversely of the machine along the upper surface of its horizontal leg, which is adapted to be engaged by a gib 63 depending from the plate 59 and extending transversely thereof.

The gibbed guide along the plate 59 is formed by two spaced guide members 64—64 secured to the upper surface of said plate as by machine screws 65—65. Said guide members extend along said plate and have lower facing recessed shouldered portions 66—66 adapted to engage the edges and upper side of the strip and guide it to the nip between the scarfing wheels 51—51 and backing roller 56. The guide plate 59 and guide members 64—64 are of a converging arcuate formation at their inner ends so as to conform to the form of the scarfing wheels 51—51 and the backing roll 56 and to extend well into the nip therebetween.

A gibbed guide 67 is provided at the discharge end of the scarfing wheel 51—51. Said gibbed guide extends well into the nip between the backing roll 56 and said scarfing wheels 51—51 and like the guide 57 includes a plate 69 having shouldered guide members 70—70 extending therealong and secured thereto as by machine screws 71. The plates 59 and 69 are connected together by a connecting member 73 herein shown as being of a substantially inverted U-shaped formation. Said connecting member is connected at the ends of its legs to said plates 59 and 69 and extends along each side of and beneath the backing roll 56. A cross bar 74 secured at ends to the side plates 15—15 serves as a slidable support for said connecting member and said gibbed guides 57 and 67. Said gibbed guides are likewise guided against lateral displacement by means of parallel spaced guide members 75—75 connected between the side plates 15—15 and slidably engaging the front and rear sides of the connecting member 73.

The apertured portions of the guide strips 64—64 and 70—70 through which machine screws 65—65 and 71—71 extend may be slotted (not shown) to permit adjustment of said guide strips to accommodate the guide means to various desired widths of strip.

The guides 57 and 67 are adjusted laterally with respect to the scarfing wheels 51—51 in an obvious manner by means of two adjusting screws 76—76 adapted to engage the outer sides of the guide members 64—64 and threaded in upright lugs 77—77 projecting upwardly from the outer ends of the angle support 60.

The backing roll 56 is journaled in bearing boxes 79—79 mounted in vertical guides 55—55 in the side plates 15—15. Each of said bearing boxes has a lug 80 projecting upwardly from its top surface and forming a seat for a compression spring 81. Similar lugs depending from the bearing boxes 54—54 form seats for the upper ends of said compression springs. Adjusting screws 83—83 threaded in cross pieces 84—84, extending across the tops of the vertical guides 55—55, are adapted to engage the top sides of the bearing boxes 54—54, and adjust the spacing of the scarfing wheels 51—51 with respect to the backing roll 56 against the springs 81—81 to determine the depth of the groove formed by said scarfing wheels. Lock nuts 85—85 threaded on said adjusting screws are provided to lock said screws and scarfing wheels in the desired position of adjustment.

As shown in Figure 5, two scarfing wheels are provided to groove and divide the strip 11 into three equal divisions, each of which divisions may be equal to the length of the finished tubular pin. One scarfing wheel 51 abuts at its outer side, a collar 86 secured to said shaft as by a pin 87. The outer side of the other scarfing wheel is abutted by a nut 88 threaded on a sleeve 89 suitably secured to said shaft. A spacing collar 90 serves to space said scarfing wheels the desired distance apart. The two scarfing wheels are thus freely rotatable with said shaft 53 during the scarfing operation and the space between the cutting edges of said scarfing wheels may be adjusted by substituting spacing collars 90 of various desired widths. Also, if desired, one scarfing wheel only can be used to divide the strip into two parts, or more than two scarfing wheels may be used where it is desired to divide the strip into more than two or three parts.

The outer edges of the strip are scarfed to bevel opposite ends of the completed pins by means of scarfing cutters 92—92 adjustably mounted in tool holders 93—93 (see Figures 1 and 4). Said tool holders are suitably mounted on and extend inwardly of the inner sides of the side plates 15—15. Said cutters may be of any well known form arranged to scarf the outer edges of the strip, so are not herein shown in detail.

During the operation of forming the tubular pins, the strip steel is initially trained from a suitable reel or uncoiler (not shown) through the gibbed guide 57 through the space between the backing roll 56 and scarfing wheel 51—51, through the gibbed guide 67 and between the advance pinch rolls 17 and 20. During this initial operation of starting the strip through the machine the scarfing wheels 51—51 are out of engagement with the strip. As soon as the strip, however, has been trained through the advance pinch rolls 17 and 20, the scarfing rolls 51—51 may be gradually engaged with the strip by tightening the adjusting screws 83—83 until said scarfing wheels are close enough to the backing roll 56 to form V-shaped grooves of the desired depth in the strip, which may be equal to at least one-fourth the thickness of the strip. The lock nuts 85—85 may then be tightened, to lock said scarfing wheels in position. At the same time the scarfing cutters 92—92 may likewise be adjusted to scarf the outer edges of the strip to the required bevel which should conform to the bevel of the grooves cut by the scarfing wheels 51—51. The motor 29 may then be started to start the pinch rolls 17 and 20 in operation and groove and bevel the outer edges of the strip.

The strip is then trained from the discharge pinch rolls 17 and 20 between the feed rolls 48—48 of the shearing and feeding apparatus 12, through a longitudinal guide 94 formed therein and through an aligned guide 95 in a feed table 96 of said shearing apparatus. Said shearing and feeding apparatus is of a form shown in application Serial No. 49,399 filed by Verne P. Donner, September 15, 1948, issued as Patent No. 2,546,390 on March 27, 1951, and entitled "Cutting and Feeding Machine," so need only be described herein to the extent necessary to make my present invention readily understandable. The strip is trained along the guide 95 over a hardened steel insert 97 in the end of said table 96, the edge of which insert forms a cutting edge cooperating with the cutter 50 (see Figures 6 and 7).

Feeding of the strip along the guides 94 and 95 is continuous until the end of the strip abuts an abutment plate 100 adjustably mounted on a block 101 mounted on a top portion of the machine frame. At this time the shearing cutter 50 moves downwardly to shear the strip into slugs or blanks 13, the lengths of which are determined by the required circumference of the finished pin. The sheared slug will then drop onto an upright rib 104 projecting upwardly from the frame of the shearing and feeding apparatus and onto a guide plate 105 on the top of the block 101, and will bridge an endless chain 106 guided in the block 101 and frame of the machine beneath the guide plate 105 in a guide 107 extending transversely of the guide 95. Said chain has a plurality of spaced fingers 109—109 extending upwardly therefrom above the top surface of the rib 104 and the guide plate 105, as shown in Figure 7. Said guide fingers extending upwardly into the space between the guide plate 105 and the rib 104 engage the blanks 13 to move them along said rib and guide plate in a direction transversely of the length of the strip and of the grain structure of the blank formed.

During the operation of cutting the blanks 13 from the leading end of the strip, feeding movement of the strip will stop and cannot be advanced until the cutter 50 is raised out of the path of the strip as it moves upwardly into position to start on its next cutting stroke. The pinch rolls 17 and 20 being continuously driven will continue to feed the strip to the shearing apparatus with the result that the strip will buckle between the discharge end of said pinch rolls and the feed rolls at the advance end of the shearing and feeding apparatus 12, which buckle will be intermittently taken up during each shearing operation. The rate of feed of the pinch rolls 17 and 20 may be coordinated with the time required to shear the strip into individual blanks so that the buckle which occurs in the strip during the cutting operation will be immediately taken up when the strip is advanced to cut the next blank.

The blanks 13—13 carried by the endless chain 106 and fingers 109—109 at right angles to the length of the strip and to the grain structure thereof, are moved along the rib 104 and guide plate 105 in end to end relation to a guide track 110 (Figure 2). Said guide track 110 bridges the space between the discharge end of the guide plate 105 and rib 104 and the pin rolling apparatus and serves to guide the blanks 13 to the nips between feeding rolls 111—111 of the tube rolling apparatus 14.

The tubular pin rolling apparatus 14 has been clearly shown and described in the Peters et al. application Serial No. 41,633 mentioned before, so need only be herein shown and described to the extent necessary to make the method of my present invention clearly understandable. As shown in Figures 1 and 2, the pin rolling apparatus comprises a plurality of cooperating roller stands including vertically spaced shafts 112—112 geared together by gearing 113 and journaled in parallel spaced side plates 114—114 of a frame 115 for the apparatus. Chain and sprocket drives 116—116 are provided to connect the lower shafts together so as to be driven by a motor 117 at speeds progressively increasing from the first to the last roller stand, to prevent the accumulation of partially formed blanks at any one roller stand, as has been described before in the aforementioned application, Serial No. 41,633.

The first roller stand includes the cooperating feed rollers 111—111. The guide 110 enters the nip between said feed rollers to guide the blanks 13—13 to said feed rollers in end to end relation. Said feed rollers serve to feed said blanks along a guide 118 which extends into the nip between first stage male and female forming rollers 119 and 120 respectively of the second roller stand (see Figures 1, 2 and 34). The guide 118 is in the form of an elongated slot or flat conduit to guide and hold the blanks in the proper position for forming between the first forming roller. It should here be noted that as the leading end of each blank 13 leaves the guide 118 and enters the nip between the rollers 119 and 120 it is slightly elevated and is discharged onto a finger or rib 122 of a guide 123. Said finger enters a slot 124 formed in the male roll 119 and is at a slightly higher level than the discharge end of the guide 118. This is to receive the blank before it leaves the nip between the forming rolls and to prevent cocking or twisting of the blanks as they pass between the forming rolls from one guide to the other, it being understood that as the blanks pass between the nips of the rolls, the tailing end is always in one guide as the advance end is supported on the rib 122 (see Figure 34). Since the unsevered blank 13 is long enough to be supported in the guides 118 and 123 during forming and is of the length of a plurality of finished pins, pins may be rolled which are very much shorter than the distance between the entering and receiving ends of the guides entering and leaving the nips between each pair of rolls. When leaving said first set of forming rolls the blank will be in the form shown in Figures 9, 14 and 19 with downwardly curved outer edges 13b.

In a like manner the guide 123 enters the nip between next succeeding forming rolls 125 and 126 as shown in Figure 35 and has a rib 127 extending along its bottom to receive and support the central portions of the partially formed blanks so as to prevent rotation of said blanks and to assure the presentation of a series of properly formed blanks to the next pass of the machine. A rib or finger 128 enters well into the nip of the second set of forming rolls 125, 126 at the discharge end thereof and forms a rib on the bottom of a guide 129 to receive the partially formed blanks and to guard them against rotation about their axes, as they leave said forming rolls.

Here again the guide 123 and rib 127 direct the blanks into the nip between the forming rolls 125, 126 at a level slightly lower than the nip thereof where they can be received into the wider portion of the recessed female roll and as the male roll forces each blank into its deformed shape and thus moves it deeper into the recessed female roll it will rise to a slightly higher level, while still being retained between said roll, and will be discharged and received by and partially supported by rib or guide finger 128 for travel along the guide 129 to a next succeeding pair of forming rolls 130, 131. During the second rolling operation the edges of the blank are turned downwardly still further, as shown in Figure 20, and the blank has not yet started to sever along the grooves 11a.

Similar guide means are provided between each pair of forming rolls although where the entire surface of the male roll serves as a support for the blank the slot in the roll to receive the guide finger and the guide finger itself are omitted. As the blank is further formed so it more closely resembles an arc of a circle, as when passing between the rolls 130 and 131 its ends have started to turn inwardly as indicated by reference character 11d in Figure 21, and the ends thereof engage shouldered portions 132 of the male roll 130, which hold it from rotation about its axis as it enters and leaves said forming rolls, as shown in Figure 26. At this stage of the operation as shown in Figure 11, 16 and 21, the blank has started to break along the outer edges of the grooves 11a due to bending of the blank along said grooves during the successive rolling operations, as indicated by reference character 11e in Figure 21.

In Figure 27 the blank is shown in a still further form of development between male and female rolls 133 and 134a and is beginning to come into the form of an arc of a circle. At this stage the inner lower edges of the blank engage opposite sides of the mandrel of the male roll and is held from twisting or cocking movement by engagement with the sides of the mandrel and thus is of itself held from twisting as it passes between said rolls and is ready to be broken along the grooves 11a—11a into individual blanks having opposite beveled edges (see Figures 12, 17 and 22).

During the next rolling operation the blank being formed between rolls 135a, 136a will break of its own accord into individual blanks of lengths equal to the lengths of the finished pins, due to fatigue of the metal caused by the bending of the blanks along the grooves 11a, as the blanks are slightly elevated and bent along said grooves, as they pass between each set of forming rolls. From this point on, the short blanks, much shorter than the distance between the entering and discharge ends of the respective guides, are capable of sustaining themselves during the rolling operation without twisting, entering the nip between the forming rolls on their respective guide and engaging the sides of the anvil of the associated male forming roll, as is shown in Figures 28 and 29.

During the final rolling stages, as shown in Figures 30 to 33, inclusive, the blanks are engaged by ribs 134, 135, 136 and 137, projecting into the forming recesses of female forming rolls 139, 140, 141 and 142 respectively, which guide the blanks through the nips of the respective forming rolls and hold them from rotation during the forming operation thereof and also cooperate with the respective forming rolls to hold the blanks to their required form. Where it is desired that the pin have no cleft gap along its length, the supporting rib may be eliminated for the final forming stages.

It may be seen from the foregoing that a succession of grooved blanks or slugs 13, each composed of a plurality of segments connected at the grooves, may be fed from the shearing and feeding machine 12 in end to end relation along the guide 110 to and between the nip of the feeding rolls 111—111, which feed the blanks in end to end relation to the first forming rolls 119, 120 to produce U-shapes which are guided to the subsequent forming rolls and further formed into C-shapes before being separated into their individual segments. When the blanks are sufficiently C-shaped so that the segments can be held against twisting upon further forming, the blanks are formed into tubular shape and as they are thus formed they break apart at the grooves into their individual segments. The successive forming rolls are operated at progressively increasing speeds to prevent the crowding or bunching up of the slugs at any one forming stage.

It may further be seen that the grooved multi-segment blanks in the initial forming stages are long enough to be held from twisting in their cooperating guides on opposed sides of the nips of the forming rolls so that the leading end of the blank may enter the exit guide before the trailing end thereof is released from the rolls or the entrance guides. Then, as the blanks are sufficiently formed so that they may, of themselves, be held against twisting movement regardless of their length, they will break into their individual segments along the groove by fatigue of the metal caused solely by the forming action thereof, and they will pass through the remaining forming operations, severed into individual blanks of lengths equal to the desired lengths of the finished pins having opposite beveled ends and much shorter than the distance between the entering and receiving ends of the guides leading to and from the nips between the forming rolls.

It may further be seen that a novel and simplified process of forming short tubular pins, much shorter than could heretofore be formed by rolling methods, has been provided which consists in grooving strip stock in the direction of its grain into divisions determined by the desired length of the finished pin, then continuously shearing the stock across its grain into blanks of lengths determined by the desired circumference of the finished pin and then passing the grooved blanks through a series of rolling operations where they will break into individual blanks of lengths equal to the length of the completed pins when sufficiently formed to be self-sustaining during the balance of the rolling operations.

While I have herein shown and described one form of apparatus for carrying out the method of my invention, I wish it to be understood that various details of the operation and construction of the apparatus may be varied without departing from the principles of my invention, and that I do not propose or wish to be construed as limiting myself to the specific method and apparatus shown excepting as expressly limited by the appended claims.

I claim as my invention:

1. The method of forming short tubular metal pins from continuous strip stock comprising the steps of feeding and longitudinally grooving the strip stock in accordance with the desired length of the finished pins, shearing the strip transversely of the length thereof into blanks of predetermined length, determined of the desired circumference of the finished pins, feeding the grooved blanks at right angles to the direction of the grooves formed therein, then passing the grooved blanks through successive forming stages and breaking the blanks into individual blanks of the length of the finished pins solely by the forming action thereon, subsequent to the initial forming stages and prior to the final forming stages.

2. The method of forming short tubular metal pins having chamfered edges at opposite ends thereof from continuous strip stock comprising the steps of feeding and longitudinally grooving the strip stock with substantially V-shaped grooves into divisions determined by the desired length of the finished pins and scarfing the edges of the strip stock, shearing the strip transversely of the length thereof into blanks of predetermined length determined by the desired circumference of the finished pins, then passing the grooved blanks through successive forming stages and breaking the blanks along the grooved portions thereof into individual blanks of lengths equal substantially to the length of the finished pins, solely by the forming action thereon, subsequent to the initial forming stages and prior to the final forming stages.

3. The method of forming short tubular metal pins from continuous strip stock comprising grooving the stock lengthwise into equal divisions determined by the desired length of the finished pins, then shearing the grooved strip transversely of the length thereof into blanks of lengths determined by the required circumference of the finished pins, feeding the grooved blanks with the grooved portions thereof extending transversely to the direction of travel of the blanks during the feeding operation thereof, then guiding and passing the grooved blanks through a series of successive rolling and forming stages and breaking the blanks into individual blanks of lengths equal to the length of the finished pins along the grooves formed therein, subsequent to the initial forming stages and prior to the final forming stages, solely of the forming action thereon.

4. The method of forming short tubular metal pins from continuous strip stock comprising grooving the strip in the direction of its grain into equal divisions determined by the desired length of the finished pins, to depths equal to at least one-fourth the thickness of the strip, then shearing the grooved strip transversely of the grain thereof into slugs of equal lengths determined by the desired circumference of the finished pins, feeding the grooved slugs transversely of the grain thereof and passing the grooved slugs through successive rolling and forming stages, and breaking the partially formed slugs into individual blanks along the grooves formed therein solely by the forming action thereon, subsequent to the initial forming stages and prior to the final forming stages.

5. In a method of rolling short tubular metal pins from continuous strip stock by a succession of spaced forming operations wherein the finished pins are considerably shorter than the distances between the successive forming operations, the steps of grooving the strip stock lengthwise with equal divisions determined by the desired length of the finished pins, then shearing the grooved strip transversely of the length thereof into blanks of equal lengths determined by the desired circumference of the finished pins, feeding the grooved blanks transversely of the grain thereof, then passing the grooved slugs through a plurality of spaced successive forming operations, and breaking the blanks into individual partially formed blanks along the lines of the grooves formed thereon solely by the forming action thereon, subsequent to the initial forming operation and prior to the final forming operation.

6. The method of forming short tubular metal pins from continuous strip stock comprising the steps of feeding and grooving the strip stock in the direction of its grain and in accordance with the desired length of the finished pins, shearing the strip transversely of the grain thereof into blanks of predetermined length, determined by the desired circumference of the finished pins, feeding the grooved blanks transversely of the grain thereof and passing the grooved blanks through a plurality of successive forming stages, and then breaking the blanks into individual pieces solely by the forming action thereon after said blanks have passed through sufficient forming stages to be self-sustaining through the balance of the forming stages.

7. In a method of forming short tubular metal pins from continuous strip stock by shearing the strip stock into blanks of predetermined length and subjecting the blanks successively to a plurality of forming operations which are separated at greater distances than the lengths of the blanks, the improvement comprising grooving the strip into equal divisions along the direction of its grain prior to the shearing operation, the width of said divisions being determined by the required length of the finished pin, the groove being V-shaped and its depth being at least equal to one-fourth the thickness of the strip to hold the grooved blanks when sheared from the strip stock in connected relation during the initial forming operations and to permit said grooved blanks to break into individual blanks of the lengths of the finished pins, when sufficiently formed to be individually self-sustaining as they are subjected to the final forming operations.

8. In a method of forming short tubular metal pins from continuous strip stock by shearing the strip stock into blanks of predetermined length and subjecting the blanks to a succession of spaced forming operations which are separated by distances greater than the lengths of the blanks, the improvement comprising grooving strip stock along the direction of its grain to a sufficient depth that will cause breakage when the stock is bent into tubular form, shearing the stock transversely to form grooved blanks, successively deforming the blanks into tubular shape, and allowing the blanks to break at the grooves thereof into separate pins only after the blanks are appreciably deformed.

9. The method of making tubular members from metal strip stock which comprises longitudinally grooving the strip stock, cutting the grooved strip stock across the width thereof to form an individual blank composed along its length of groove separated but interconnected segments, successively bending the blank along its length to form in succession U-shapes, C-shapes, and finally tubular shapes, guiding the shapes as they are formed, maintaining the blank segments in connected relation during formation of the U and C shapes to provide elongated guide surfaces, and breaking the blank along the groove into individual tubular segments.

10. The method of making tubular members from metal strip stock which comprises beveling the sides of metal strip stock to form oppositely inclined edges, cutting a longitudinal V-groove in the strip stock between the sides of the strip with each side of the V-groove inclined oppositely to the next adjacent inclined edge of the strip, cutting the beveled and grooved strip across the width thereof to form an individual blank composed along its length of groove separated but interconnected segments, successively bending the blank along its length in a plurality of spaced operations to produce a tubular shape with the inclined edges and groove sides around the outer surface of the tubular shape, guiding the blank with the segments in connected relation during the initial bending steps to provide elongated guide surfaces, and breaking the blank at the groove to form individual segments with beveled ends during the final bending operations after the blank has been sufficiently bent to provide each segment with guide surfaces that will prevent twisting of the segments during the subsequent bending operation.

ARTHUR FRANK ZITZEWITZ.

REFERENCES CITED

The following references are of record in the file of this patent:

UNITED STATES PATENTS

| Number | Name | Date |
| --- | --- | --- |
| 351,987 | Lewis | Nov. 2, 1886 |
| 515,270 | Zimmerman | Feb. 20, 1894 |
| 642,901 | Glader | Feb. 6, 1900 |
| 653,900 | Bray | July 17, 1900 |
| 653,911 | Heggie | July 17, 1900 |
| 653,913 | Heggie | July 17, 1900 |
| 935,906 | Grant | Oct. 5, 1909 |
| 1,040,398 | Parmelee | Oct. 8, 1912 |
| 1,360,241 | Muller | Nov. 23, 1920 |
| 1,378,992 | Berg | May 24, 1921 |
| 1,406,867 | Howarth | Feb. 14, 1922 |
| 1,574,397 | Kirsch | Feb. 23, 1926 |
| 1,599,164 | Bundy | Sept. 7, 1926 |
| 1,602,588 | Podee | Oct. 12, 1926 |
| 1,787,255 | Klocke | Dec. 30, 1930 |
| 1,835,002 | Birckmayer | Dec. 8, 1931 |
| 1,920,275 | Poepellmeier | Aug. 1, 1933 |
| 1,924,230 | Davis | Aug. 29, 1933 |
| 1,964,584 | Klocke | June 26, 1934 |
| 2,005,853 | Davis | June 25, 1935 |
| 2,024,485 | Sussman | Dec. 17, 1935 |
| 2,043,665 | Iversen | June 9, 1936 |
| 2,092,255 | Keller | Sept. 7, 1937 |
| 2,127,618 | Riemenschneider | Aug. 23, 1938 |
| 2,222,842 | Humphrey | Nov. 26, 1940 |
| 2,444,463 | Nordquist | July 6, 1948 |